(No Model.)

J. K. MORRIS.
DENTAL PLATE.

No. 315,319. Patented Apr. 7, 1885.

Witnesses:
Orra C. Moore.
M. T. Anderson.

Inventor:
James K. Morris,
By Thomas G. Orwig, Atty

UNITED STATES PATENT OFFICE.

JAMES K. MORRIS, OF DES MOINES, IOWA, ASSIGNOR OF ONE-HALF TO S. L. EDWARDS, OF SAME PLACE.

DENTAL PLATE.

SPECIFICATION forming part of Letters Patent No. 315,319, dated April 7, 1885.

Application filed June 20, 1884. (No model.)

*To all whom it may concern:*

Be it known that I, JAMES K. MORRIS, dentist, a citizen of the United States, and a resident of Des Moines, in the county of Polk and State of Iowa, have invented a Method for Producing Elastic and Polished Dental Plates of Uniform Thickness, of which the following is a specification.

Heretofore the surfaces of dental plates made of vulcanized rubber or celluloid have been polished by means of scrapers, brushes, &c., and at the expense of much time and labor.

Metal dies have also been made from an original gypsum cast and a thin sheet-metal plate swaged between the dies to receive their impress and the configuration of the mouth and the swaged metal plate placed upon the lingual surface of the rubber plate, to remain there while the rubber plate was vulcanized in a flask, and removed when the rubber plate was hard and cool, to thus produce a polished surface on the one side of the vulcanized plate.

Figure 1:
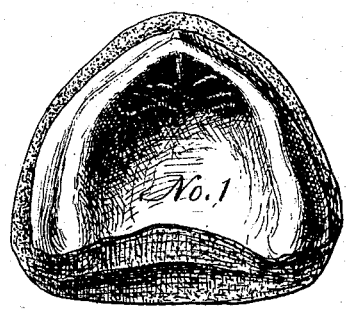
Figure 2:
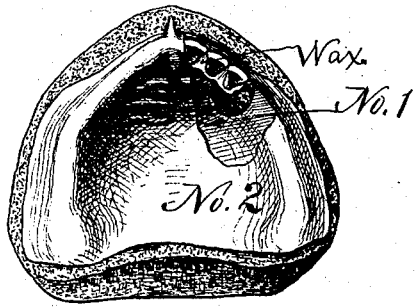
Figure 3:
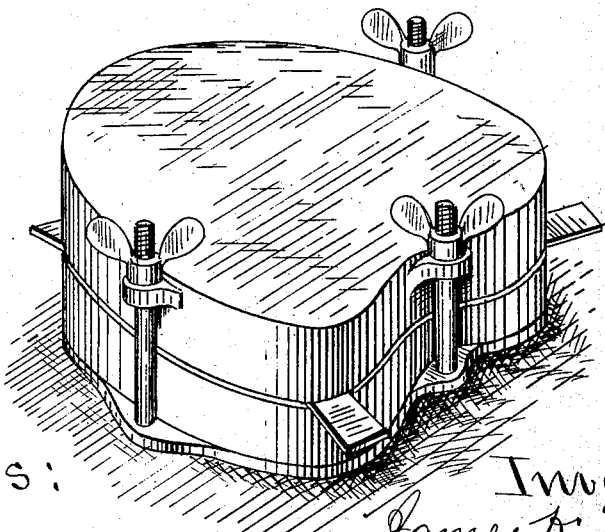

My improvement in the art contemplates producing vulcanized dental plates that will be highly polished on both sides, elastic, and uniform in thickness as they come from the flask without using metal dies or swaged metal plates; and my invention consists in the following-described method:

I take a common plaster cast, such as is represented by Figure 1 of the accompanying drawings, and coat the top surface with shellac or other suitable varnish, and then, before the varnish is dry, I place a sheet of tea-lead, No. 1, over the varnished surface, and by means of a burnisher or in any suitable way press the tea-lead into the creases and depressions to assume and retain all irregularities of the surface of the plaster cast upon which it is thus fixed. I next arrange the teeth and secure them to the covered gypsum cast by means of wax in a common way, and then place a second sheet of tea-lead, No. 2, upon the first plate and the wax around the teeth, as indicated in Fig. 2, and rub and press it to receive the imprint of the original plaster cast surface underneath it. After the two plates of tea-lead are thus applied I cover the outside surface of the upper or No. 2 sheet of tea-lead with shellac or other suitable varnish, and then place the cast in a flask and fill in gypsum in a common way to form the upper cast required. After the upper cast is hard in the flask I lift it from the lower cast, and in so doing separate the No. 1 and No. 2 tea-lead plates, which adhere to the surfaces of the upper and lower casts. I then rub crude mercury over the exposed surfaces of the tea-lead plates Nos. 1 and 2 with the fingers or in any suitable way to polish the same. The mercury forms a chemical union with the lead, and polished surfaces are readily and quickly produced by simply rubbing the mercury upon the tea-lead coverings that are fastened to the gypsum by means of the varnish. I next take the rubber sheet that is to be transformed into an elastic dental plate of uniform thickness and highly polished on both sides and place it upon the polished tea-lead surface of the lower cast and cover it with the upper cast, that is fast in the detachable upper part of the flask, and to regulate the thickness of the finished dental plate I simply place metal pins or graduated wedges between the edges of the upper and lower parts of the flask, as indicated in Fig. 3, to keep them apart, and to produce a space between the casts corresponding with the desired thickness of the finished plate, while the unfinished plate is being vulcanized and hardened by means of heat in a common way.

When the flask is opened and the upper and lower casts or molds are separated, the finished vulcanized plate will not adhere to the polished surface of the tea-lead coverings of the casts or molds, but separate therefrom, bearing their impress and a highly-polished surface on both sides.

The advantages of a plate of uniform thickness and highly polished on both sides thus produced are, first, that they cost less time and labor, and afford a better profit to the dentist than any other; second, they will give better satisfaction to the customer, because their uniform thickness, elasticity, and high polish on both sides will cause them to fit and adhere to the mouth without causing irritation and the annoyances and discomforts incident to the use of dentures that lack any one of these three essential qualities named.

I claim as my invention—

1. The herein-described method of producing a polished surface on a dental cast or mold, which method consists in applying tea-lead or its equivalent to the surface of a cast or mold and then covering the surface of the tea-lead with mercury, substantially as set forth, for the purposes specified.

2. The herein-described method or process of producing dentures or dental plates of uniform thickness and polished surfaces, which process consists in fastening tea-lead to the surface of a cast or mold by means of an adhesive varnish, then fastening teeth to the cast by means of wax, then placing a second covering of tea-lead over the first and over the wax at the side of the teeth, then covering it with varnish, then forming a cast on top of the tea-lead coverings of the first or lower cast, then separating the two casts and polishing their tea-lead surface with mercury, then placing a rubber plate between the two polished surfaces of the cast or molds, then fastening the separable parts of the flasks to maintain a space between the mating and polished surfaces of the casts while the rubber plate is being vulcanized and hardened in a common way.

JAMES K. MORRIS.

Witnesses:
SURRY L. EDWARDS,
THOMAS G. ORWIG.